United States Patent [19]

Moeller

[11] 4,216,252
[45] Aug. 5, 1980

[54] SOLVENTLESS RELEASE COATING

[75] Inventor: Richard E. Moeller, Troy, N.Y.

[73] Assignee: General Electric Company, Pittsfield, Mass.

[21] Appl. No.: 533,959

[22] Filed: Dec. 18, 1974

[51] Int. Cl.$^2$ .................. B05D 3/02; B05D 1/28
[52] U.S. Cl. .................. 427/387; 427/428; 428/352; 428/447; 428/452; 528/15; 528/31; 528/32
[58] Field of Search .............. 427/428, 387; 260/46.5 G, 46.5 UA; 428/352, 447, 452; 528/15, 31, 32

[56] References Cited

U.S. PATENT DOCUMENTS

| | | | |
|---|---|---|---|
| 2,199,228 | 4/1940 | Obenshain et al. | 427/428 |
| 3,307,963 | 3/1967 | Webber | 428/352 X |
| 3,328,482 | 6/1967 | Northrup et al. | 428/352 X |
| 3,344,111 | 9/1967 | Chalk | 260/46.5 UA |
| 3,436,366 | 4/1969 | Modic | 260/825 X |
| 3,539,384 | 11/1970 | Kolesinskas | 427/428 |
| 3,575,788 | 4/1971 | Funk et al. | 428/352 |
| 3,653,945 | 4/1972 | Davis et al. | 427/428 X |
| 3,679,458 | 7/1972 | Sorell et al. | 428/352 |
| 3,801,544 | 4/1974 | Mink et al. | 260/46.5 G X |
| 3,882,083 | 5/1975 | Berger et al. | 260/825 X |
| 3,900,617 | 8/1975 | Grenoble | 260/46.5 G X |
| 3,922,443 | 11/1975 | Brown et al. | 260/46.5 G X |
| 3,928,629 | 12/1975 | Chandra et al. | 260/46.5 UA X |

Primary Examiner—Roland E. Martin, Jr.
Assistant Examiner—Stuart D. Frenkel
Attorney, Agent, or Firm—Morgan, Finnegan, Pine, Foley & Lee

[57] ABSTRACT

A novel process is disclosed for the manufacture of a release "paper" which is based on the application of a fluid silicone composition to a paper substrate. The silicone fluid is directly applied without any solvent and without emulsification. The application technique is based on the use of a two-roll offset gravure coating apparatus wherein the substrate to be coated is run at a higher speed than the gravure roll.

1 Claim, 2 Drawing Figures

SOLVENTLESS RELEASE COATING

This invention provides a novel method for the production of a release "paper" which is based on the application of a fluid silicone composition to a substrate without any solvent and without emulsification of the silicone fluid.

BACKGROUND OF THE INVENTION

Pressure sensitive adhesives are widely employed on tapes, labels, carpet tiles and many other articles commonly employed in the home, offices and factories. On many of these articles the adhesive surface is protected by a release "paper" which may be easily peeled off immediately prior to use.

It should be understood that as used herein, the term release "paper" is used to include not only paper but also other protective substrates such as synthetic films, e.g. polyethylene, pvc, polyester, etc., which require release properties when employed as a protective backing on adhesive surfaces. Also, it is possible to coat the adhesive directly over the cured solventless silicone composition and thereafter employ a transfer coating technique to place that adhesive against the appropriate face stock surface.

The release "papers" of the prior art have been coated with silicone compositions that have been applied in a solvent or emulsion type of dispersion. This coating method has required a curing cycle which would effect removal of any solvent or extraneous liquid that was present in the silicone containing dispersion. The presence of these extraneous liquids required higher energy costs for drying and also pollution problems were caused by the need to vent the solvent. Also, if the solvent was collected and recycled, this further added to the cost. Recently, solvents have been in short supply and this has also contributed to production problems.

Therefore, a need has existed for a process that could efficiently produce a release "paper" without the use of a solvent. One problem encountered in the direct application of a solvent-free silicone fluid is the difficulty in controlling the amount of silicone fluid that is applied to the "paper" substrate so that a minimum effective amount of silicone may be applied. This minimum amount is important for producing an acceptable release "paper" at economic application rates.

Conventional offest gravure coating techniques have not been satisfactory for this purpose as the application levels have been too high to be acceptable. It has been discovered that the application level may be reduced to acceptable levels if the substrates is run through the gravure coating apparatus at a linear speed that is greater than the linear speed of the gravure roll.

Accordingly, it is a primary object of this invention to provide a method of manufacturing a release "paper" which is carried out without the aid of a solvent or emulsified system.

It is also an object of this invention to provide a method for coating a substrate with a minimum effective amount of a silicone composition.

It is also an object of this invention to provide a method of making a release "paper" with a minimum use of energy and a minimum amount of pollution of the environment.

DESCRIPTION OF THE INVENTION

The invention provides a novel method of coating a substrate with a minor amount of a silicone composition. The silicone composition consists essentially of (a) a vinyl chain-stopped polysiloxane having the formula:

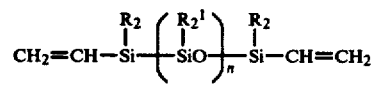

wherein R and $R^1$ are monovalent hydrocarbon radicals free of aliphatic unsaturation with at least 50 mole percent of the R and $R^1$ groups being methyl and n has a value sufficient to provide a fluid material having a viscosity of from 200–5000 centipoises at 25° C., preferably 300–400 cps;

(b) a platinum catalyst;

(c) an amount of a liquid organohydrogenpolysiloxane having the formula:

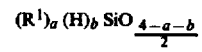

sufficient to provide from about 0.5 to about 1.0 silicone-bonded hydrogen atoms per silicone-bonded vinyl group in the composition, wherein $R^1$ is as defined above, a is from 1.00 to 2.10, b is from about 0.1 to 1.0 and the sum of a plus b is from about 2.00 to 2.67, there being at least 2 silicon bonded hydrogen atoms per molecule; said method comprising applying said silicone composition to a substrate with a two roll offset gravure coating machine wherein the substrate is run at a higher speed than the gravure roll.

The substrate that is coated may be a protective substrate that is made of paper or synthetic films. The cured silicone coated surface may be laminated to an appropriate face stock substrate that has been coated with adhesive or alternatively, the adhesive may be coated over the cured silicone coated surface and then laminated to an appropriate face stock substrate. This results in the transfer of the adhesive to the face stock substrate.

As used herein the term monovalent hydrocarbon radicals free of aliphatic unsaturation is used to include alkyl radicals, e.g., methyl, ethyl, propyl, butyl, octyl, etc. radicals; aryl radicals, e.g., phenyl, tolyl, xylyl, etc. radicals; cycloalkyl radicals, e.g., cyclohexyl, cycloheptyl, etc, radicals; aralkyl radicals, e.g., benzyl, phenylethyl, etc. radicals. In the preferred embodiments of the invention R and $R^1$ will be selected from phenyl and methyl radicals with the especially preferred embodiments being all methyl.

The amount of silicone composition that is applied to the paper substrate should be between about 0.1 and 4.0 lbs. per 3000 ft.$^2$ or more preferably between 0.1 and 2.0 lbs. per 3000 ft.$^2$. The curing operation should be carried out in an oven at a temperature of from 150°–650° F. to cure the silicone composition.

The organohydrogenpolysiloxane may be linear, cyclic or resinous in nature, but preferably is linear or resinous. One illustrative material is a linear dimethyl hydrogen chain-stopped dimethylpolysiloxane material containing from 2 to 3 silicon atoms in the molecule. A further specific compound may be a resinous copolymer of dimethylsiloxane units, methylhydrogensiloxane units and trimethylsiloxane units which contain from 2 to 5 or 10 or more silicon atoms per molecule. Also illustrative are 1,3,5,7-tetromethylcyclotetrasiloxane; a copolymer containing three dimethylhydrogen siloxane units and one monomethylsiloxane unit per molecule; and a low viscosity fluid composed of dimethylhydrogen siloxane units and $SiO_2$ units in the ratio of 2 moles of the former to 1 mole of the latter. Especially useful is a linear methylhydrogenpolysiloxane fluid or resinous methylhydrogenpolysiloxane. Such components are well known to those skilled in this art and are described in U.S. Pat. No. 3,436,366 which is hereby incorporated by reference. Also, U.S. Pat. No. 2,491,843 describes a useful family of linear trimethylsilyl chainstopped polysiloxanes. One is made by cohydrolyzing 5 parts of $(CH_3)_3$-SiCl and 95 parts of $CH_3HSiCl_2$; viscosity 100 cps. at 25° C. The viscosity of the organohydrogenpolysiloxanes may be varied between 10 and 10,000 cps. The preferred range is between 500 and 5000 cps.

An essential feature of the invention relates to the fact that the paper must be run at a higher speed than the gravure roll. The applicator roll may be run at the same speed as the gravure roll or it may be run at the same speed as the paper. The former method results in a "wiping" action of the paper on the applicator roll while the latter method results in a wiping action between the applicator roll and the gravure roll. The effect of the "wiping" action is to lower the quantity of silicone composition deposition rate on the finished product. The ratio of the gravure roll linear velocity to the line speed should be between 0.1 and 0.9.

The components of the vinyl chain-stopped polysiloxane are well known in the art and are described in U.S. Pat. No. 3,436,366 which is hereby incorporated by reference. The particular vinyl chain-stopped polysiloxanes employed in this invention have a lower viscosity than the materials disclosed in the aforementioned patent and are readily prepared by those skilled in the art. The liquid organohydrogenpolysiloxanes are also described in U.S. Pat. No. 3,436,366.

As a platinum catalyst, the chloroplatinic acid compounds of Speier, U.S. Pat. No. 2,823,218, can be used, e.g., as solutions in alcohols, water, glycols, esters, particularly isopropanol and the dimethylether of diethylene glycol. Also suitable are the platinum hydrocarbon complexes of Ashby, U.S. Pat. No. 3,159,601, which are of the general formula (Pt $Cl_2$.olefin)$_2$ and H(Pt $Cl_3$.olefin) wherein the olefins are alkenes of 2 to 8 carbon atoms, cycloalkenes of 5 to 6 carbon atoms, styrene, and the like. These complexes are formed, e.g., by reacting chloroplatinic acid with olefin, e.g., ethylene, and they are soluble in hydrocarbon solvents, e.g., benzene, toluene, mineral spirits, or oxygenated solvents, such as dioxane, tetrahydrofuran, and the like. Also suitable as platinum barrier compounds are the platinum cyclopropane complexes of Ashby, U.S. Pat. No. 3,159,662 of the general formula (Pt $Cl_2$.$C_3H_6$)$_2$. These are made, for example, by treating (Pt $Cl_2$.$C_2H_4$)$_2$ (described in U.S. Pat. No. 3,159,601) with cyclopropane in chloroform and glacial acetic acid, and they are soluble in hydrocarbon solvents, e.g., benzene, toluene, xylene, mineral spirits, alcohols or ethers, such as octanol or tetrahydrofuran. Further illustrative of suitable platinum compounds are the platinum alcoholate (etherate, carbonyl) complexes of Lamoreaux, U.S. Pat. No. 3,220,972. These are formed by reacting chloroplatinic acid with a higher alcohol, e.g., octanol, or an aldehyde, e.g., octyl aldehyde, or an ether alcohol, e.g., monoethyl ether of diethylene glycol, at 70°-75° C. under a vacuum for about 16 hours.

Another family of platinum compounds comprises the platinumvinyl siloxane complexes disclosed in Karstedt, U.S. Pat. No. 3,715,334 and U.S. Pat. No. 3,775,452, both of which are assigned to the assignee of the present invention. They are made by effecting a reaction between a platinum halide and an unsaturated siloxane, e.g., 1,3-divinyltetramethyl disiloxane, and removing available inorganic halogen from the resulting reaction product. Especially suitable is a platinum complex of tetramethyldivinyl disiloxane which can be prepared by adding 25 parts of $NaHCO_3$ to a mixture of 25 parts of sodium chloroplatinite, 50 parts of 1,3-divinyltetramethyldisiloxane and 125 parts of ethyl alcohol, heating for 15 minutes at 70°-75° C. then filtering, washing and stripping. The residue is a platinum-divinyltetramethyldisiloxane, substantially free of chemically combined chlorine. It is soluble in many inert organic solvents, e.g., hydrocarbons such as benzene, toluene, xylene, heptane, mineral spirits, alcohols, ethers, and the like, such as ethanol, pentanol, tetrahydrofuran, dioxane, etc.

With respect to all of the platinum compounds, a suitable concentration of the compound in the solvent will provide from 0.1% by weight to 20% or higher by weight assayed as platinum metal. Preferably, however, concentrations assaying as platinum metal in the range of 0.1 to 15% by weight may be used. A solution of the compound in a hydrocarbon solvent, e.g., toluene, assaying for 1% platinum metal, is especially convenient.

Also a tetraalkyl titanate may be added to the silicone composition to improve adhesion. Generally from 1-5%, preferably 3% of tetrabutyl titanate may be employed. However, the inclusion of the tetraalkyl titanate has a tendency to retard the cure and the curing temperature may have to be raised to increase the rate of cure.

A cure inhibitor such as vinyl acetate is also employed at a level of 400 ppm to prevent premature (i.e. room temperature) curing of the silicone composition and provide extended bath life. If the inhibitor is not present the composition will rapidly cure and become unuseable. Other cure inhibitors which may be employed include those disclosed in the Chalk patents, U.S. Pat. Nos. 3,188,299; 3,188,300; 3,344,111 which are hereby incorporated by reference. Also alkenyl substituted isocyanurates such as triallylisocyanurate, ethylacetoacetate, N,N-dimethylformamide or N-allylmethylcarbonate may be used as cure inhibitors. The silicone compositions used in the practice of this invention may be prepared with 80-100 parts by weight of the vinyl chain-stopped polysiloxane and 5-15 parts by weight of the organohydrogenpolysiloxane.

DESCRIPTION OF THE PREFERRED EMBODIMENTS

Figure 1:
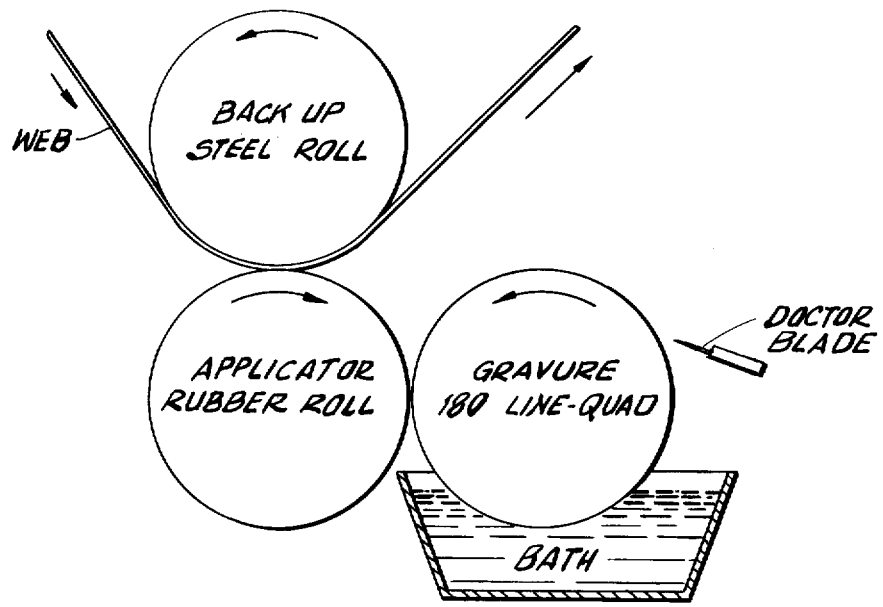
FIG. 1 is a diagram of the arrangement of the rollers in a gravure coating apparatus wherein the gravure roller and the applicator roller are in the same horizontal plane.
Figure 2:
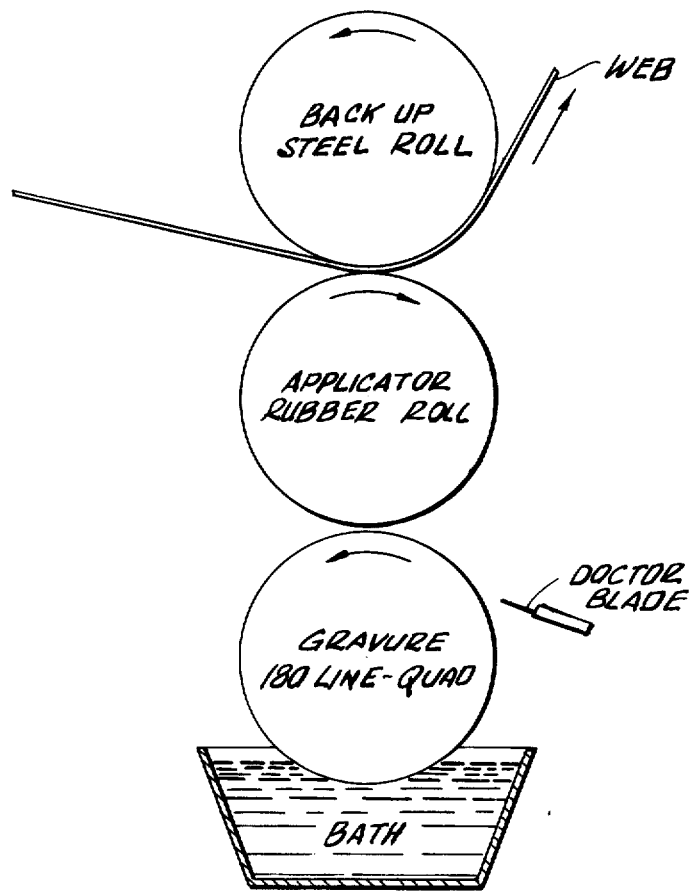
FIG. 2 is a diagram of the arrangement of the rollers in a gravure coating apparatus wherein the gravure roller and the applicator roller are in the same vertical plane.

A two roll offset gravure coating apparatus is used in the application of the silicone compositions. FIG. 1 is a diagram of the roller arrangement employed in this type of apparatus. In this apparatus, the gravure roll and the rubber roll are in the same horizontal plane. The gravure roll picks up the silicone from the bath and excess fluid is removed by the doctor blade. The fluid in the gravure cells is then transferred from the cells to the rubber roll. The fluid on the rubber roll is then split, with approximately 50% of it being transferred to the paper and the other half remaining on the rubber roll. Gravure rolls having 140-340 quadrangular cells per linear inch may be used. The use of rolls with finer line spacings will result in lower quantities of silicone composition being deposited on the release paper.

In one test, a coating machine manufactured by Worldwide Converting Machinery was used with a 180 line quadrangular roll with a cell depth of 0.0018 inch. The curing oven was 25 feet long with two 12.5 foot zones. In this coating head, the line speed could be operated independently of the coating head speed. For example, while the coating head speed would be held constant at 11 ft./min., the line speed could be increased from 11 ft./min to as high as 100 ft./min. To maintain smooth operation, the steel backup roll is run at line speed, while the gravure roll and rubber applicator roll were held constant. Since this results in a wiping action of the web over the applicator roll, a minimum amount of pressure is applied by the backup roll against the paper and the applicator roll. Two different papers were coated during the tests. Most of the coating was done on a 42# semibleached Plainwell, but a 50# "glassine like" Deerfield was also used. The felt side was coated in all cases.

The silicone composition comprises 100 parts by weight of a vinyl chain-stopped polyorganosiloxane having a viscosity of 300-400 centipoise at 25° C., 10 parts by weight of a methyl hydrogen polysiloxane containing composition having a viscosity of about 700 centipoises, a platinum catalyst as prepared in the above referenced Lamoreaux patent and a vinyl acetate inhibitor.

As mentioned above, the gravure roll employed was a 180 line quadrangular roll. Since the theoretical direct deposition was 4.65 lbs./ream (3000 ft.$^2$), the theoretical deposition for a two roll offset coating configuration (one film split) would be approximately 2.3 lbs./ream. This assumes that the coating head and the web are synchronized. However, if the speed of the web is increased relative to the coating head (or the speed of the coating head retarded relative to the web speed), the amount of fluid available to any given area of the web is decreased. Consequently, the smaller this ratio becomes, the lower the deposition on the web.

Table I contains a series of theoretical calculations to show the different depositions that could be expected depending on the selection of the gravure roll. The calculations are based on the assumption that the same film splits and wiping actions which were observed during this trial are independent of the choice of gravure roll. For example, during the trial a head to line ratio of 0.35 gave a deposition of 1.45 lbs./ream which is 31% of the theoretical direct deposition. Consequently, a 200 line quad roll, operating in the same manner, should give a deposition of 0.69 lbs./ream (31% of the theoretical direct deposition for that roll).

TABLE I

| Gravure Roll | Theoretical Direct Deposition | Calculated Depositions At Different Head/line Ratios (lbs./ream) | | | | |
|---|---|---|---|---|---|---|
| | | 1.0 | 0.58 | 0.48 | 0.35 | 0.11 |
| 190 line quad | 2.76 | 1.38 | 1.17 | 0.98 | 0.73 | 0.53 |
| 200 line quad | 2.21 | 1.11 | 0.85 | 0.79 | 0.69 | 0.43 |
| 120 line pyramid | 2.12 | 1.06 | 0.90 | 0.76 | 0.66 | 0.41 |
| 140 line pyramid | 1.61 | 0.81 | 0.68 | 0.58 | 0.50 | 0.31 |
| 165 line pyramid | 1.10 | 0.55 | 0.47 | 0.39 | 0.33 | 0.21 |

A number of runs were made using the same 180 line quadrangular roller. One run was made using a technique wherein the paper web passed over the steel backup roll to apply a "kiss coat". Two control runs were also made using the same silicone formulation in solvent based systems at 10 and 50% solids. The results are set forth in Table II:

TABLE II

| Test | Substrate | Coating Technique | Line Speed (Ft/Min) | Head/Line | Ovens (°F.) | Cure | Deposition (lbs./ream) |
|---|---|---|---|---|---|---|---|
| 1 | Plainwell | Kiss Coat | 43 | 0.58 | 450/400 | OK | 0.94 |
| 2 | Plainwell | Offset Gravure | 43 | 0.58 | 450/77 | OK | 1.97 |
| 3 | Plainwell | Offset Gravure | 80 | 0.48 | 450/550 | OK | 1.66 |
| 4 | Plainwell | Offset Gravure | 25 | 0.35 | 500/77 | OK | 1.45 |
| 5 | Plainwell | Offset Gravure | 25 | 0.11 | 500/77 | OK | 0.90 |
| 6 | Deerfield | Offset Gravure | 50 | 0.48 | 350/350 | OK | 1.91 |
| 7* | Plainwell[1] | Offset Gravure | 150 | 0.35 | 500/500 | OK | 1.16 |
| 8* | Plainwell[2] | Offset Gravure | 30 | 0.35 | 500/500 | OK | 0.43 |

[1]10% Heptane
[2]50% Heptane
*Control

The cure profile of a silicone composition employing 3 parts by weight tetrabutyl titanate was investigated using cure times from 50 seconds at 350° F. to 3.7 seconds at 625° F. The results are shown on Table III:

TABLE III

| Test | Oven Temperture (°F.) Zone 1/Zone 2 | Line Speed (Ft./Min.) | Cure | Dwell Time (Seconds) |
|---|---|---|---|---|
| 9 | 350/350 | 30 | OK | 50 |
| | | 40 | Smear | 37.5 |
| | | 50 | Smear | 30 |
| | | 60 | Smear | 25 |

TABLE III-continued

| Test | Oven Temperture (°F.) Zone 1/Zone 2 | Line Speed (Ft./Min.) | Cure | Dwell Time (Seconds) |
|---|---|---|---|---|
| 10 | 400/400 | 50 | OK | 30 |
|  |  | 60 | Smear | 25 |
| 11 | 450/500 | 300 | Smear | 5 |
| 12 | 450/550 | 80 | OK | 18.75 |
| 13* | 500/500* | 120 | OK | 12.5 |
|  |  | 150 | Smear | 10 |
| 14 | 600/600 | 200 | OK | 7.5 |
|  |  | 250 | OK | 6.0 |
|  |  | 300 | OK | 5.0 |
|  |  | 350 | Smear | 4.3 |
| 15 | 600/650 | 350 | OK | 4.3 |
|  |  | 400 | OK | 3.7 |
|  |  | 450 | Smear | 3.3 |

*Control run with 10% added heptane

Another series of tests were run on a two roll offset gravure coating apparatus wherein the gravure roll and the applicator roll were arranged in a vertical plane. In these tests, the gravure roll was run at a lower linear velocity than the applicator roll and consequently the wiping action occured in the nip between these two rolls. Thus, the backup roll, the paper web and the applicator roll were run at one speed, while the gravure roll operated at a lower speed. The oven used with the offset gravure coating head was a vertical 45 feet (total length) dryer. It consisted of two 22.5 feet zones, with each zone capable of a maximum temperature of 400° F. The silicone compositions contained 100 parts by weight of a vinyl chain-stopped polyorganosiloxane having a viscosity of 300–400 cks at 25° C., 10 parts by weight of a methyl hydrogen polysiloxane fluid having a viscosity of 700 centipoise, 400 ppm of vinyl acetate as a cure inhibitor, a platinum catalyst and where indicated 3 parts by weight of tetrabutyltitanate.

The gravure roll used was a 180 line quadrangular roll (i.e. 180 quadrangular cells per linear inch).

A number of tests were carried out using the above-described composition. The offset gravure coating apparatus was operated with the gravure roller and applicator roller arranged in a vertical plane. The deposition studies were carried out by infra red spectroscopy and by foil deposition measurements. The substrates were cured at 350° F. The following substrates were evaluated:
A—Weyerhaeuser Supercalendered Kraft
B—M & O Clay Coat Paper
C—Polyester film
The results of these tests are summarized in Table IV.

TABLE IV

| Test | Cure | Line Speed ft./min. | Head/ line | Sub-strate | Deposition (IR) lbs./ream | Deposition lbs./ream |
|---|---|---|---|---|---|---|
| 16* | OK[1] | 20 | 1.0 | A | 2.19 | 1.75 |
| 17 | OK[1] | 20 | 0.50 | A | 1.00 | 0.73 |
| 18 | OK[1] | 20 | 0.25 | A | 0.69 | 0.52 |
| 19* | OK | 20 | 1.0 | B | — | 1.60 |
| 20 | OK | 20 | 0.50 | B | — | 1.22 |
| 21 | OK | 20 | 0.25 | B | — | 0.70 |
| 22[2] | OK | 80 | 0.125 | B | — | — |
| 23[2] | OK | 60 | 0.167 | B | — | — |
| 24 | OK | 40 | 1.0 | A | — | 1.72 |
| 25 | OK | 50 | 0.5 | A | — | 1.13 |
| 26 | OK | 50 | 0.25 | C | — | 0.65 |
| 27 | OK | 100 | 1.0 | A | — | — |
| 28 | OK | 200 | 1.0 | A | — | — |
| 29 | OK | 300 | 1.0 | A | — | — |
| 30 | OK[1] | 50 | 0.25 | B | — | 0.61 |
| 31 | OK[1] | 20 | 0.18 | A | 0.47 | — |
| 32 | OK[3] | 20 | 0.18 | A | 0.49 | — |

*Control
[1] 3% tetrabutyl titanate
[2] could not obtain a uniform coating
[3] coating bath consisted of 100 parts by weight of a vinyl chainstopped polyorganosiloxane with a viscosity of 3700 cps, 5 parts by weight, of a methyl hydrogen containing polysiloxane with a viscosity of 700 cps, and 3 parts by weight of tetrabutyl titanate.

The release properties of several of the release papers were evaluated. The test numbers which correspond to the test number of Table III indicate that the tested release paper is the identical paper. A Gelva 263 acrylic adhesive was applied to the silicone coated paper at a thickness of 7.5 mils (wet).

After the adhesive was properly dried, the sheets were laminated to supercalendared kraft face stock. The laminates were cut into 2 in. × 9 in. strips and aged for various times at 77° F. and 140° F. before release values were determined. Release was measured in gms./2 in. at 400 in/min. The results are summarized in Table V.

TABLE V

| Test | Deposition lbs./ream | Aged at 77° F. 1 Day | 1 Week | 3 Weeks | Aged at 140° F. 1 Day | 1 Week | 2 Weeks |
|---|---|---|---|---|---|---|---|
| 17 | 1.00[1] | 65 | 125–160 | 160 | 50–75 | 150–200 | 120 |
| 18 | 0.69[1] | 100–125 | 7500 | 400–500 | 100–125 | 150–175 | 140–160 |
| 21 | 0.70[2] | tear | tear | — | tear | tear | — |
| 31 | 0.47[1] | — | 150–160 | 90 | — | 75 | 100–120 |
| 32 | 0.49[1] | — | 200–350 | 150–250 | — | 350–450 | 250–300 |

[1] determined by IR
[2] determined by aluminum foil

Obviously, other modifications and variations of the present invention are possible in the light of the above teachings. It is, therefore, to be understood that changes may be made in the particular embodiments of the invention described which are within the full intended scope of the invention as defined by the appended claims.

I claim:

1. A method for coating a substrate with from 0.1 to 2.0 lbs. per 3000 ft² of a solvent free silicone composition which consists essentially of:

(a) a vinyl chain-stopped polysiloxane having the formula:

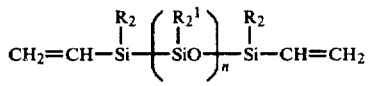

wherein R and R¹ are monovalent hydrocarbon radicals free of aliphatic unsaturation with at least 50 mole percent of the R and R¹ groups being methyl and n has a value sufficient to provide a fluid material having a viscosity of from 200–5000 centipoises at 25° C.;

(b) a platinum catalyst;

(c) an amount of a liquid organohydrogenpolysiloxane having the formula:

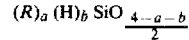

sufficient to provide from about 0.5 to 1.0 silicon-bonded hydrogen atoms per silicon-bonded vinyl group in the composition, wherein R is as defined above, a is from 1.00 to 2.10, b is from about 0.1 to 1.0 and the sum of a plus b is from 2.00 to 2.67, there being at least 2 silicon bonded hydrogen atoms per molecule; and (d) a cure inhibitor which prevents premature curing of the silicone composition; said method comprising applying said silicone composition to a substrate with a two roll offset gravure coating machine having an applicator roll and a gravure roll, wherein the applicator roll is run at the same speed and in the same direction as the paper and ratio of the gravure roll linear velocity to the paper speed is between 0.1 and 0.9, and thereafter heating the coated paper to cure said silicone composition.

* * * * *